United States Patent Office 2,868,840
Patented Jan. 13, 1959

2,868,840

α-HALOGENO-ETHYLPHENYL BOROXOLES AND METHOD OF PREPARATION

Arthur K. Hoffmann, Stamford, Conn., assignor to American Cyanamid Company, New York, N. Y., a corporation of Maine No Drawing. Application September 6, 1957
Serial No. 682,313

10 Claims. (Cl. 260—606.5)

This invention relates to new chemical compounds and to a method of preparing the same and, more particularly, to new and useful boron compounds and their preparation. Still more particularly the invention is concerned with the production of B-substituted boroxoles.

The B-substituted boroxoles of this invention may be represented by the general formula

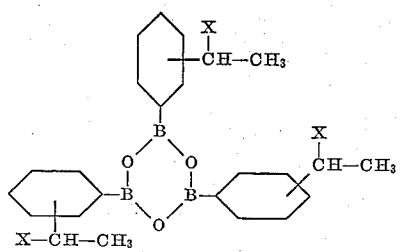

where X represents a halogen selected from the class consisting of chlorine and bromine. When X represents chlorine, the compound is an alpha-chloroethylphenyl boroxole (o-, m- or p-α-chloroethylphenyl boroxole, or a mixture of any two or all three of these isomers in any proportions); and when X represents bromine, the compound is an alpha-bromoethylphenyl boroxole (o-, m- or p-α-bromoethylphenyl boroxole, or a mixture of any two or all three of these isomers in any proportions).

The new compounds embraced by Formula I are particularly useful as chemical intermediates, for instance in the preparation of vinylphenyl boroxoles as is described in the copending application of Arthur K. Hoffmann, Stephen J. Groszos and Walter M. Thomas, Serial No. 682,312, filed concurrently herewith. They also may be used as fuel additives to improve certain properties of the fuel (e. g., aviation and other gasolines, as well as other fuels); as additives to increase the flame resistance of the material into which the B-substituted boroxole has been incorporated or applied as a coating or an impregnant, e. g., paper, wood, organic textile materials of all kinds (for instance fabrics of cotton, wool, linen, silk, nylon, Dacron, polyacrylonitrile fibers, e. g., Creslan, Orlon, etc., the various rayons, cellulose esters, etc.), gums and resins, both natural and synthetic (e. g., rosin, shellac, melamine-aldehyde resins, urea-aldehyde resins, urea-melamine-aldehyde resins, phenol-aldehyde resins, acetone-aldehyde resins, aniline-aldehyde resins, alkyd resins, polyester resins, polyvinyl resins, for instance polystyrene, poly-(methylstyrenes), poly-(chlorostyrenes), polyacrylonitrile, etc., in the form of their homopolymers and copolymers, polyvinyl acetal resins, etc.); as sizing agents, for instance as a sizing agent for glass fibers and fabrics, etc.; as curing catalysts for accelerating the cure of resins and other curable (or potentially curable) materials; and for numerous other purposes.

The broad class of compounds known generally as boroxoles is old; but to the best of my knowledge and belief the compounds of the present invention are new to the art; that is to say, they were unknown prior to the present invention.

One method of preparing the compounds of this invention is by reacting together, under anhydrous conditions and in an inert, anhydrous, liquid medium, (1) an ethylphenyl boroxole and (2) a compound represented by the general formula II  (CH₂CO)₂N—X where X has the same meaning as given above with reference to Formula I. The ethylphenyl boroxole can be an o-, m- or p-ethylphenyl boroxole, or it can be a mixture of any two or all three of these isomers in any proportions. Compounds embraced by Formula II are N-chlorosuccinimide and N-bromosuccinimide.

The ethylphenyl boroxole of (1) and the N-halogenosuccinimide of (2) are employed in a molar ratio of 1 mole of the former to about 3 moles (e. g., from 2.9 to 3.1 moles) of the latter. The reaction can be effected at atmospheric pressure or under superatmospheric pressures.

The reaction is effected in an inert (substantially completely inert), anhydrous (substantially completely anhydrous), liquid medium. By "inert" or "substantially completely inert" anhydrous, liquid medium is meant an anhydrous liquid medium which is so inert or non-reactive toward the reactants and the reaction product that it will not affect the course of the reaction or the constitution of the reaction product. The reaction product is an alpha-chloroethylphenyl boroxole when the starting halogeno reactant is N-chlorosuccinimide or an alpha-bromoethylphenyl boroxole when the halogeno reactant is N-bromosuccinimide. By "anhydrous" or "substantially completely anhydrous" liquid medium in the foregoing sentences is meant one which contains no more than a trace of water, and by "liquid medium" is meant a medium which is liquid at the temperature employed in effecting the reaction. In other words, the inert, anhydrous, liquid medium in which the reaction advantageously is effected may or may not be a liquid at room temperature or at any other temperature below the reaction temperature. Preferably a liquid medium which is volatile (volatilizable) without decomposition is employed. Good results have been obtained using an inert, anhydrous, liquid medium, e. g., carbon tetrachloride, wherein the ethylphenyl boroxole dissolves and the N-halogenosuccinimide disperses.

The reaction between the ethylphenyl boroxole and the N-halogenosuccinimide occurs under heat, for example at a temperature ranging from about 60° C. up to and including the melting point of the N-halogenosuccinimide employed. Thus, the upper limit of temperature is about 150° C. when the N-halogenosuccinimide is N-chlorosuccinimide and about 175° C. when the N-halogenosuccinimide is N-bromosuccinimide. The above-mentioned temperatures are lower than the melting point of the ethylphenyl boroxole reactant and of the alpha-chloro-(or -bromo-)ethylphenyl boroxole obtained as a product of the reaction. Thus, the reaction between the primary reactants can be effected in an inert, anhydrous, liquid medium (e. g., carbon tetrachloride) and under refluxing conditions. Good results have been obtained by effecting the reaction at about 80° C.

To initiate the reaction and thereby to shorten substantially the total time required for completing the reaction, I have found that it is advantageous to add to the reaction mass a catalytic amount of a free-radical catalyst, that is, a catalyst which liberates free radicals under the particular conditions of reaction. Examples of such catalysts are the various organic peroxy catalysts, e. g., benzoyl peroxide, and the various azo catalysts, e. g., alpha, alpha'-azodiisobutyronitrile. Additional examples will be given hereinafter. If an initiator (catalyst) is used, the chosen free-radical catalyst should be soluble (at least to some extent) in the chosen inert, anhydrous, liquid medium in order to obtain satisfactory results.

At the end of the reaction period a B-substituted boroxole (or mixture of B-substituted boroxoles) of the kind embraced by Formula I is isolated from the reaction mass by any suitable means. It may be done, for example, by filtering off (or otherwise separating) the by-product succinimide from the liquid reaction mass in which it is wholly or partly insoluble, and removing (as by distillation, for example) the inert, anhydrous, liquid medium. Upon removal of such liquid reaction medium by distillation, the crude product of the reaction comprises the residue. The crude product can be purified, if desired, by means commonly employed in the purification of organic compounds.

GENERAL METHOD OF PREPARING AN ETHYLPHENYL BOROXOLE

An ethylphenyl boroxole can be prepared, for example, by dehydrating the corresponding ethylphenyl boronic acid, for instance while the said boronic acid is submitted to azeotropic distillation while admixed with a liquid solvent (e. g., toluene) until substantially all the water has been removed. The solvent is removed, for example by vacuum evaporation, to yield the desired ethylphenyl boroxole as a crystalline material.

An ethylphenyl boronic acid can be made by, for instance, a Grignard reaction between an ethylphenyl-magnesium bromide (in an anhydrous diethyl ether solution) and tri-n-butyl borate to obtain the di-n-butyl ester of ethylphenyl boronic acid, followed by hydrolysis of the latter (preferably under acidic conditions) to yield the free acid.

The Grignard reagent, i. e., the ethylphenyl-magnesium bromide, is prepared in known manner by adding an ethylbromobenzene (a known compound) to magnesium in anhydrous diethyl ether.

ADDITIONAL EXAMPLES OF INERT, ANHYDROUS, LIQUID REACTION MEDIA

Carbon tetrachloride (mentioned hereinbefore) is especially suitable for use as an inert, anhydrous, liquid medium in which the reaction between the ethylphenyl boroxole and N-halogenosuccinimide can be effected. Other examples include chloroform, benzene, any of the saturated alkanes which normally are liquids or are liquid at the particular reaction temperature and pressure employed (e. g., n-hexane and other isomers of hexane or mixtures thereof, the various heptanes, octanes, nonanes, decanes, etc.), chlorinated aliphatic and aromatic compounds, e. g., uns.-tetrachloroethane, propylene chloride, chlorobenzene, etc.

The amount of inert, anhydrous, liquid reaction medium employed may be varied as desired or as conditions may require, but ordinarily the amount thereof is such that the reactants (ethylphenyl boroxole+N-halogenosuccinimide) constitute from about 1% to about 50% by weight thereof.

ADDITIONAL EXAMPLES OF FREE-RADICAL CATALYSTS

Benzoyl peroxide (a peroxy catalyst) and alpha,-alpha'-azodiisobutyronitrile (an azo catalyst) have been mentioned hereinbefore as specific examples of free-radical catalysts that can be used in practicing the method features of the present invention.

Additional examples of peroxy type of free-radical catalysts are the various organic peroxy catalysts, illustrative examples of which latter are: the dialkyl peroxides, e. g., dipropyl peroxide, dibutyl peroxide, dilauryl peroxide, dioleyl peroxide, distearyl peroxide, di-(tert.-butyl) peroxide and di-(tert.-amyl) peroxide; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; urea peroxide; the various organic solvent-soluble percarboxylic acids; organic solvent-soluble percarbonates, persulfates, perborates, etc.; and others that will be apparent to those skilled in the art from the foregoing examples.

Additional examples of azo type of free-radical catalysts include the following:

Dimethyl alpha,alpha'-azodiisobutyrate
alpha,alpha'-Azobis (alpha-methylbutyronitrile)
alpha,alpha'-Azobis (alpha-ethylbutyronitrile)
alpha,alpha'-Azobis (alpha,gamma-dimethylvaleronitrile)
alpha,alpha'-Azobis (alpha-methylvaleronitrile)
alpha,alpha'-Azobis (alpha-methylcapronitrile)
alpha,alpha'-Azobis (alpha-n-butylcapronitrile)
alpha,alpha'-Azobis (alpha-isobutyl-gamma-methylvaleronitrile)
alpha,alpha'-Azobis (alpha-isopropyl-beta-methylbutyronitrile)
alpha,alpha'-Azobis (alpha,beta-dimethylbutyronitrile)
alpha,alpha'-Azobis (alpha,gamma-dimethylcapronitrile)
1,1'-azodicyclopentanecarbonitrile Reference is made to Hunt U. S. Patent No. 2,471,959, dated May 31, 1949, for additional examples and for a generic description of compounds of this class.

The amount of catalyst, if used, is relatively small, e. g., from, by weight, about 0.1 part of catalyst per 1000 parts of the total amount of the primary reactants (ethylphenyl boroxole+N-halogenosuccinimide) to about 4 or 5 parts of catalyst per 100 parts of the total amount of the primary reactants.

The reaction also may be catalyzed by ultra-violet light or beta rays, X-rays or gamma rays.

In order that those skilled in the art better may understand how the present invention can be carried into effect, the following examples are given by way of illustration and not by way of limitation. All parts and percentages are by weight unless otherwise stated.

Example 1

(A) PREPARATION OF INTERMEDIATES (a) *p-Ethylbromobenzene.*—To two kg. (18.85 moles) of ethylbenzene contained in a 5-liter, 3-necked, round-bottom flask equipped with a stirrer, addition funnel, reflux condenser and hydrogen-bromide trap, are added 100 g. of iodine and 3 g. of steel wool. Following solution of the iodine, 3,083 g. (19.25 moles) of bromine are added at a rate such that the temperature of the reaction mixture does not exceed 60° C. After hydrogen bromide evolution has ceased following completion of the bromine addition, the reaction mass is washed with excess 10% aqueous sodium hydroxide solution, and then with 10% aqueous sodium thiosulfate solution until colorless. After drying over solid sodium hydroxide, the product is distilled to obtain 3,306 g. (92% of the theoretical yield), B. P. 196–215° C. The mixture of isomeric bromides is then fractionally distilled to separate the o- and p-isomers; pure para isomer, $n_D^{25}$ 1.5425.

(b) *p-Ethylphenylboronic acid*.—p-Ethylbromobenzene, 555 g. (3.0 moles), is added dropwise to 73 g. (3.15 moles) Mg in 1 liter of anhydrous ether (diethyl ether). After completion of the reaction, the ether solution of p-ethylphenyl-magnesium bromide is added dropwise under nitrogen pressure to a solution of 913 g. (3.98 moles) of n-butyl borate (tri-n-butyl borate) in 800 ml. of anhydrous ether cooled to —70° C. in a Dry Ice-acetone bath. After the addition of the Grignard solution has been completed, the reaction mixture is allowed to warm slowly to room temperature. The reaction mass is allowed to remain at ambient temperature for 12 hours before decomposition.

The reaction mass is decomposed by the addition of 1 liter of 10% aqueous sulfuric acid. The ether layer is separated, and evaporated on a water bath. Following the removal of ether, the butanol-water system is made alkaline with aqueous sodium hydroxide solution, and the butanol is removed by distillation in vacuo. Water is added from time to time to maintain a volume of about 3 liters. When the butanol has been removed, the aqueous solution is acidified with hydrochloric acid, and the resultant precipitate of p-ethylphenylboronic acid is filtered off, and recrystallized once from hot water. Yield: 378 g., 84% of the theoretical yield; M. P. 149°–150° C.

(c) *p - Ethylphenylboroxole*.—p - Ethylphenylboronic acid, 284 g. (1.9 moles), is refluxed in 1 liter of toluene in a flask fitted with a Dean and Stark trap to remove water. When water no longer appears in the condensate, the toluene is removed by vacuum evaporation to yield crystalline p-ethylphenylboroxole, M. P. 194°–195° C.

(B) PREPARATION OF p-α-BROMOETHYLPHENYL-BOROXOLE p-Ethylphenylboroxole, 147 g. (0.372 mole), is dissolved in 3.25 liters of anhydrous carbon tetrachloride. N-bromosuccinimide, 200 g. (1.125 moles), is added and the reaction mixture is heated to reflux. A free-radical catalyst, specifically benzoyl peroxide, 1.0 g., is then added to initiate the reaction. In the absence of such a catalyst more than 8 hours is required before reaction begins, while in the presence of an initiating or catalytic amount of benzoyl peroxide bromination is complete in about 3 hours. After completion of the reaction the by-product succinimide, which is insoluble in carbon tetrachloride, is removed by filtration, washed with small portions of carbon tetrachloride and the solvent removed from the filtrate by evaporating it on a water bath. Cooling the residue results in the formation of a pale-tan, crystalline mass of crude p-α-bromoethylphenyl boroxole which, on recrystallization from 1:1 benzene-cyclohexane (by volume), yields 212 g. (90% of theory) of cream-colored product. An additional recrystallization provides a white product, M. P. 183.5–184° C.

*Analysis*.—Calc'd. for $C_{24}H_{24}O_3Br_3B_3$: C, 45.56; H, 3.82; Br, 37.90; B, 5.13. Found: C, 45.51; H, 3.97; Br, 38.16; B, 5.09.

*Example 2*

PREPARATION OF p-α-CHLOROETHYLPHENYL BOROXOLE

Essentially the same procedure is followed as described under 1–B with reference to the preparation of p-alpha-bromoethylphenyy boroxole with the exception that, instead of using 1.125 moles of N-bromosuccinimide, there are used 1.125 moles of N-chlorosuccinimide. The crude product, p-alpha-chloroethylphenyl boroxole, is purified likewise as described under 1–B with reference to the corresponding bromoethylphenyl boroxole. A good yield of purified product is obtained.

I claim:

1. A compound represented by the general formula

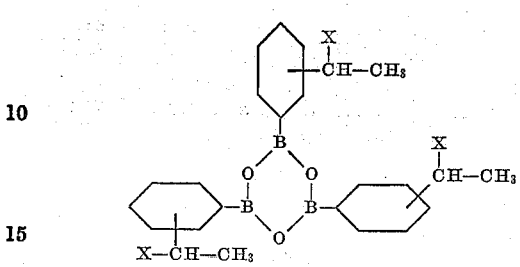

where X represents a halogen selected from the class consisting of chlorine and bromine.

2. An α-bromoethylphenyl boroxole.

3. p-α-Bromoethylphenyl boroxole.

4. The method of preparing a compound represented by the general formula

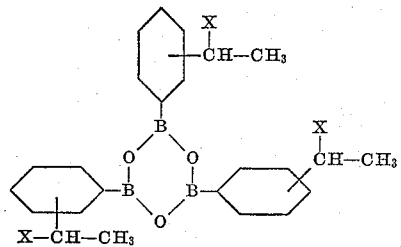

where X represents a halogen selected from the class consisting of chlorine and bromine, said method comprising reacting together, under anhydrous conditions and in an inert, anhydrous, liquid medium, (1) an ethylphenyl boroxole and (2) a compound represented by the general formula

$(CH_2CO)_2N—X$ where X has the same meaning as given above with reference to the first formula, the boroxole of (1) and the compound of (2) being employed in a molar ratio of 1 mole of the former to about 3 moles of the latter; and isolating a compound represented by the first formula from the resulting reaction mass.

5. A method as in claim 4 wherein X (both formulas) represents bromine.

6. The method of preparing p-α-bromoethyl boroxole which comprises reacting together, under anhydrous conditions and in an inert, anhydrous, liquid medium, p-ethylphenyl boroxole and N-bromosuccinimide in a molar ratio of 1 mole of the former to about 3 moles of the latter; and isolating p-α-bromoethyl boroxole from the resulting reaction mass.

7. A method as in claim 6 wherein reaction between the reactants is effected under refluxing conditions.

8. The method of preparing p-α-bromoethyl boroxole which comprises reacting together p-ethylphenyl boroxole and N-bromosuccinimide in a molar ratio of 1 mole of the former to about 3 moles of the latter, said reaction being effected under anhydrous and refluxing conditions, in an inert, anhydrous, liquid medium, and using a catalytic amount of a free-radical catalyst to initiate the reaction; and isolating p-α-bromoethyl boroxole from the resulting reaction mass.

9. The method of preparing p-α-bromoethyl boroxole which comprises reacting together p-ethylphenyl boroxole and N-bromosuccinimide in a molar ratio of 1 mole of the former to about 3 moles of the latter, said reaction being effected under anhydrous and refluxing conditions, in an inert, anhydrous, liquid medium, and using a catalytic amount of an organic peroxide as a catalyst to initiate the reaction; and isolating p-α-bromoethyl boroxole from the resulting reaction mass.

10. The method of preparing p-α-bromoethyl boroxole which comprises reacting together p-ethylphenyl boroxole and N-bromosuccinimide in a molar ratio of 1 mole of the former to about 3 moles of the latter, said reaction being effected under anhydrous and refluxing conditions, in an inert, anhydrous, liquid medium, and using a catalytic amount of benzoyl peroxide as a catalyst to initiate the reaction; and isolating p-α-bromoethyl boroxole from the resulting reaction mass.

References Cited in the file of this patent

UNITED STATES PATENTS 2,817,632  Mayor _____ Dec. 24, 1957

OTHER REFERENCES

Konig: Journal für prakt. Chem., vol. 128, pp. 157–158 (1930).

Lappert et al.: Chemical Reviews, vol. 56, p. 1005 (1956).